United States Patent [19]
Wakotsch

[11] Patent Number: 5,312,118
[45] Date of Patent: May 17, 1994

[54] QUICK MOUNTING DEVICE WITH A CENTERING EFFECT FOR MOUNTING A VEHICLE WHEEL ON THE AXLE OF A BALANCING MACHINE

[76] Inventor: Horst Wakotsch, Schulze-Delitzsch-Str. 21, 3006 Burgwedel 1, Fed. Rep. of Germany

[21] Appl. No.: 29,891

[22] Filed: Mar. 11, 1993

[30] Foreign Application Priority Data

Apr. 11, 1992 [DE] Fed. Rep. of Germany ... 9205071[U]

[51] Int. Cl.$^5$ .............................................. G01M 1/02
[52] U.S. Cl. .................................. 279/2.03; 73/487; 269/48.1
[58] Field of Search .............. 279/2.03, 2.15, 2.01, 279/2.02, 2.04, 46.7, 2.12; 242/68.1, 68.2, 72 R; 269/48.1; 73/487

[56] References Cited

U.S. PATENT DOCUMENTS

| | | | |
|---|---|---|---|
| 4,640,517 | 2/1987 | Lovatt | 279/2.15 |
| 4,909,493 | 3/1990 | Yonezawa | 269/48.1 X |
| 4,918,986 | 4/1990 | Warkotsch | 269/48.1 X |

FOREIGN PATENT DOCUMENTS

3808755C2 1/1992 Fed. Rep. of Germany .

*Primary Examiner*—Steven C. Bishop
*Attorney, Agent, or Firm*—Allegretti & Witcoff, Ltd.

[57] ABSTRACT

A quick mounting device with a centering effect for mounting a motor vehicle wheel on the axle of a balancing machine is provided with a flange permanently carried on the axle for frictional engagement of the wheel rim and with choking devices for tightening the rim against the flange. The quick mounting devices also includes a conical arrangement having an outer part with a cylindrical outer face for engagement with the centering hole of the motor vehicle wheel and with a conical inside face and with an inside part having an internal bore for placing the inside part on the axle of the balancing machine and having a conical outside face with a complementary shape to the conical inside face of the outer part, whereby the inside part of the conical arrangement is under tension from a spring, applying tension in the direction of the centering hole, and a radial flange with a contact surface for coming in contact with the wheel rim extends from the cylindrical outside face of the outside part of the conical arrangement. The outside part is formed by separate segments held on the inside part by means of resilient devices. The spreadable elements of the outside part of the conical arrangement are designed as segments that are completely independent of each other. They can move practically unhindered and in parallel over a large radial range without resulting in any jamming, twisting or excessive bending.

7 Claims, 1 Drawing Sheet

QUICK MOUNTING DEVICE WITH A CENTERING EFFECT FOR MOUNTING A VEHICLE WHEEL ON THE AXLE OF A BALANCING MACHINE

BACKGROUND OF THE INVENTION

This invention concerns a quick mounting device with a centering effect for mounting a motor vehicle wheel on the axle of a balancing machine.

German Patent De 3,808,755 C2 discloses a quick mounting device of the type in question. With this type of mounting device a flange for frictional engagement of the rim of a motor vehicle wheel is mounted permanently on the axle. Chucking devices are used to tighten the rim against the flange. In addition, a conical arrangement is also provided for engaging in the central hole of the rim. A spring presses the conical arrangement in the direction of the centering hole. The conical arrangement has an outer part with a cylindrical outside face for engagement in the centering hole of the motor vehicle wheel and with a conical inside face. In addition, the conical arrangement has an inside part having an internal bore for placing the inside part on the axle of the balancing machine, and it has a conical outside face shaped so it is complementary to the conical inside face of the outside part and rests against it. The two parts of the conical arrangement can be spread apart radially. A radial flange with a contact face for coming in contact with the rim of the motor vehicle wheel is provided on the outside part. The inside part of the conical arrangement is placed under a bias tension by a spring acting in the direction against the direction of tightening of the motor vehicle wheel.

The inside part and the outside part of the conical arrangement are partially slotted in the axial direction so that they can be spread apart radially in this area.

When a motor vehicle wheel is placed on the outside part of the conical arrangement, the rim rests against the radial flange on the outside part so it is entrained against the tension direction of the spring in contact with the inside part of the conical arrangement.

The bias tension provided by the spring results in a force which causes the spreadable area of the outside part of the conical arrangement on the conical outside face of the inside part to be divided and thus spread apart outwardly so the cylindrical outside surface is in contact with the inside edge of a centering hole of the rim. The radial spreading results in a tolerance-free centering of the centering hole and thus the rim with respect to the axle of the balancing machine.

One disadvantage of this know quick mounting device is that the radial spreadability is relatively minor because the outside part can be spread apart radially only to a limited extent since it forms a partially slotted sleeve. Above the unslotted portion of the sleeve, the spreadable parts are interconnected so the spreadability is very limited in accordance with the low radial elasticity. Therefore, practically, it is necessary to provide a separate conical arrangement for each centering hole diameter. This requires a great expense for the user.

An object of this invention is to provide a quick mounting device of the type in question that is suitable for different centering hole diameter.

A feature of this invention is to design the spreadable elements of the outside part of the conical arrangement as segments that are completely independent of each other and thus can move unhindered over a wide radial range practically parallel to each other without resulting in jamming, twisting or excessive ending. A basic idea of this invention is to design the spreadable elements of the outside part of the conical arrangement as segments that are completely independent of each other and thus can move practically in parallel over a large radial range with no hindrance and without jamming, twisting or bending excessively. The loose segments are held on the inside parts only by the resilient devices.

The resilient devices may be formed by an elastic ring that surrounds the segments with some tension. The elastic ring may preferably run in a circumferential groove in the segments.

Another expedient refinement of this invention consists of the fact that the segments are secured by guides to prevent them from moving in the circumferential direction. This is advantageous because in this way their arrangement in the circumferential direction cannot change, which would have negative effects on the accuracy of the balancing operation. The guides may be formed by pins which project outward out of the segments and are guided in axial slits in the inside part of the conical arrangement.

Finally, an expedient refinement of the present invention consists of the fact that the segments have edges that face radially inward and engage behind mating edges on the inside part of the conical arrangement and thus prevent axial slippage of the segments down from the inside part.

BRIEF DESCRIPTION OF THE DRAWING

This invention will now be explained in greater detail with reference to the figures shown in the attached drawing wherein like numerals refer to like elements and wherein.

DETAILED DESCRIPTION OF THE PRESENT INVENTION

Figure 1:
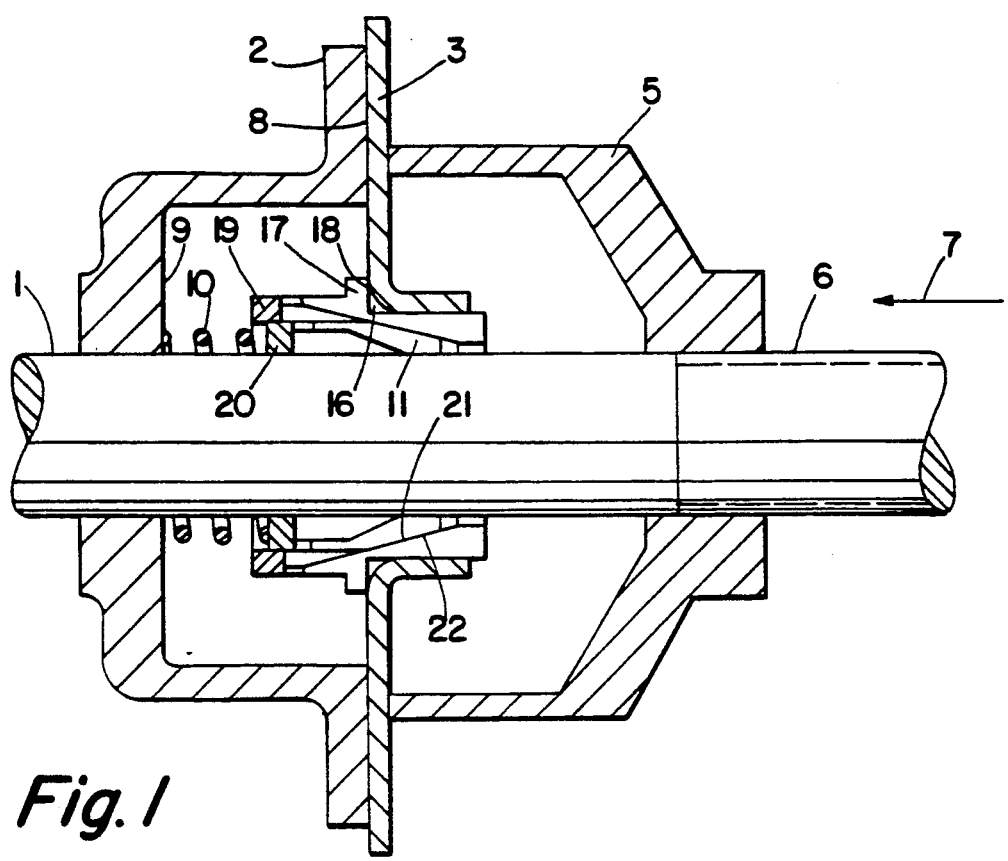
FIG. 1 shows a cross sectional view of a known quick mounting device.

FIG. 1 shows an axle 1 of a balancing machine (not shown). A pot-shaped flange 2 sits permanently on the axle and the rim 3 of a motor vehicle wheel (not shown) is pressed against flange 2 by edge 4 of a pressure pad 5 which is pressed in the direction of arrow 7 by means of a tension screw (not shown) which is screwed onto an outside thread 6 of axle 1. Rim 3 is thus frictionally engaged and is in close contact with a contact face 8 of flange 2.

A spring 10 which is in contact with an inside part 11 of a chuck that is designed as a conical arrangement 12 rests on the bottom 9 of the pot-shaped flange 2, and the outside part 13 of this chuck is in contact on its outside cylindrical face 14 with an inside cylindrical face 15 of a centering hole 16 of wheel rim 3.

A radial flange 17 extends outwardly from the cylindrical outside face 14 and is in contact with wheel rim 3 with a radial contact face 18 and thus supplies the reactive force from spring 10.

Parts 11 and 13 of conical arrangement 12 have ring-shaped parts 19 and 20 with slotted parts extending from them to the right in the drawing, with the inside part 11 having a conical outside face 21 and part 13 having a conical inside face 22 so the slotted part of the inside part 11 of conical arrangement 12 rests with no tolerance on axle 1 when they are brought together, while the cylindrical outside face 14 and part 13 come to rest with no tolerance on the inside face 15 of centering hole 16 of wheel rim 3. Since there is no play between the conical faces 21 and 22, there is no play at all when properly centered.

In tightening wheel rim 3 on axle 1, wheel rim 3 is first pushed with centering hole 16 onto cylindrical outside face 14, whose diameter in this state is somewhat smaller than the diameter of inside face 15. Then wheel rim 3 is advanced in the direction of arrow 7, so first wheel rim 3 comes to rest on contact face 18 and thus part 13 of the conical arrangement 12 is entrained in the direction of arrow 7 and spring 10 is put under tension and the conical inside face 22 comes to rest against the conical outside face 21. Thus the spring chuck is widened and the centering effect occurs. Finally, the movement of wheel rim 3 takes place by means of the pressure pad 5 in combination with the tension bolt (not shown) until finally the edge 4 of pressure pad 5 presses wheel rim 3 tightly against contact face 8 of flange 2.

With this known quick mounting device, the spreadable parts are attached securely to the ring-shaped parts 19 and 20 so their radial spreadability is greatly limited.

Figure 3:
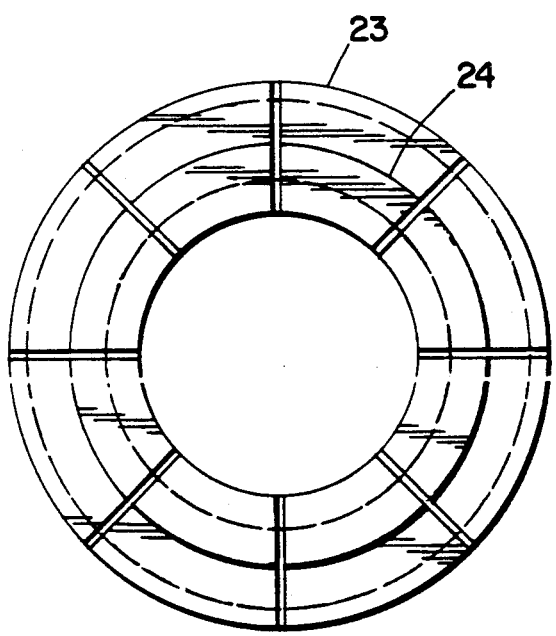
FIG. 3 shows an axial view of the conical arrangement according to FIG. 2.
Figure 2:
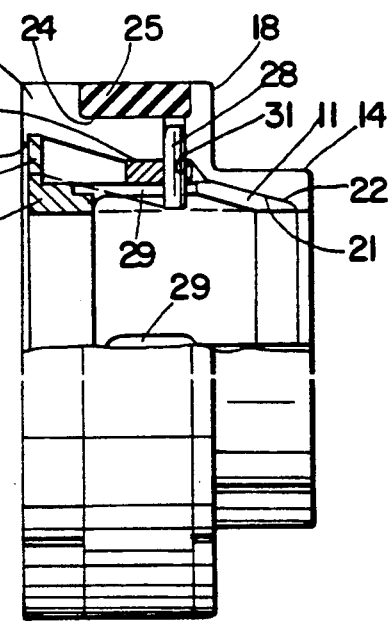
FIG. 2 shows a conical arrangement of the present invention with a device according to FIG. 1, as seen in a partially cutaway radial view

With the quick mounting device according to this invention, a conical arrangement according to FIGS. 2 and 3 is used with the quick mounting device according to FIG. 1. The same parts or corresponding parts are provided with the same reference numbers. The inside part 11 of the conical arrangement is practically unchanged in comparison with that shown in FIG. 1, extending from the ring-shaped part 20 which can be pushed onto axle 1. The main difference here is that the outside spreadable parts are formed by segments 23 that are completely independent of each other. More specifically segments 23 are not connected to a joint ring-shaped part 19, as in FIG. 1. When segments 23, with a conical inside face 22, comes to rest on the conical outside face 21 when a motor vehicle wheel rim is pressed against the contact face 18, segments 23 move radially outward in parallel until the cylindrical outside face 14 comes to rest on the inside edge of a centering hole of a wheel rim.

A circumferential groove 24 in segments 23 hold a resilient member or rubber ring 25 that in turn holds the segments 23 with their conical inside faces 22 in contact with the conical outside faces 21. In addition, rubber ring 25 assures that when a wheel rim is removed the spreadable segments 23 will move back together by sliding with their conical inside faces down on the conical outside faces 21. In order to limit this sliding motion, a flange 26 that faces radially outward and is engaged by flange 27 directed radially inward on segments 23 is provided on the ring-shaped part 20 and thus limits the axial movement of segments 23 or the inside part 11.

Pins 28 that engage radially in elongated holes 29 in inside part 11 are inserted into segments 23 and in this way secure segments 23 in their peripheral position with respect to inside part 11.

Inside segments 23 there is a ring 30 which has radial bores 31, in which pins 28 are guided. In the arrangement of ring 30, engagement of pins 28 in holes 29 is not absolutely necessary because ring 30 determines the peripheral position of segments 23 relative to each other.

While I have shown and described a presently preferred embodiment of the present invention, it will be understood that a person skilled in the art may make variations and modifications without departing from the spirit and scope of the invention.

I claim:

1. A quick mounting device having a centering effect for mounting a motor vehicle wheel on the axle of a balancing machine, a flange mounted permanently on the axle for friction engagement of the rim of the motor vehicle wheel, chucking devices for tightening the rim against the flange, a conical arrangement having an outside part with a cylindrical outside face for engagement in the centering hole of the motor vehicle wheel and a conical inside face and an inside part having an internal bore for placement of the inside part on the axle of the balancing machine and having a conical outside face shaped so it is complementary to the conical inside face of the outside part and resting against the latter, whereby the inside part of the conical arrangement is placed under tension in the direction of the centering hole by spring means, and a radial flange with a contact face for coming in contact with the rim of the motor vehicle wheel extending from the cylindrical outside face of the outside part of the conical arrangement, characterized in that the outside part (13) is formed by separate segments (23) held on the inside part (11) by resilient means that apply a tension force to the segments.

2. A quick mounting device according to claim 1, characterized in that the resilient means comprises an elastic ring that surrounds the segments with tension.

3. A quick mounting device according to claim 2, characterized in that the elastic ring is a rubber ring (25) that runs in a circumferential groove (24) on said segments (23).

4. A quick mounting device according to claim 1, characterized in that said segments (23) being secured by guides to prevent them from moving in the circumferential direction.

5. A quick mounting device having a centering effect for mounting a motor vehicle wheel on the axle of a balancing machine, a flange mounted permanently on the axle for friction engagement of the rim of the motor vehicle wheel, chucking devices for tightening the rim against the flange, a conical arrangement having an outside part with a cylindrical outside face for engagement in the centering hole of the motor vehicle wheel and a conical inside face and an inside part having an internal bore for placement of the inside part on the axle of the balancing machine and having a conical outside face shaped so it is complementary to the conical inside face of the outside part and resting against the latter, whereby the inside part of the conical arrangement is placed under tension in the direction of the centering hole by spring means, and a radial flange with a contact face for coming in contact with the rim of the motor vehicle wheel extending from the cylindrical outside face of the outside part of the conical arrangement, said outside part (13) being formed by separate segments (23) held on the inside part (11) by resilient means, said segments (23) being secured by guides to prevent them from moving in the circumferential direction, said guides being formed by pins (28) which project inwardly out of segments (23) and are guided in grooves

(29) that run axially in the inside part (11) of the conical arrangement.

6. A quick mounting device having a centering effect for mounting a motor vehicle wheel on the axle of a balancing machine, a flange mounted permanently on the axle for friction engagement of the rim of the motor vehicle wheel, chucking devices for tightening the rim against the flange, a conical arrangement having an outside part with a cylindrical outside face for engagement in the centering hole of the motor vehicle wheel and a conical inside face and an inside part having an internal bore for placement of the inside part on the axle of the balancing machine and having a conical outside face shaped so it is complementary to the conical inside face of the outside part and resting against the latter, whereby the inside part of the conical arrangement is placed under tension in the direction of the centering hole by spring means, and a radial flange with a contact face for coming in contact with the rim of the motor vehicle wheel extending from the cylindrical outside face of the outside part of the conical arrangement, said outside part (13) being formed by separate segments (23) held on the inside part (11) by resilient means, said segments (23) being secured by guides to prevent them from moving in the circumferential direction, said guides being formed by pins (28) that engage in redial bores (31) in a ring (30) arranged radially inside said segments.

7. A quick mounting device having a centering effect for mounting a motor vehicle wheel on the axle of a balancing machine, a flange mounted permanently on the axle for friction engagement of the rim of the motor vehicle wheel, chucking devices for tightening the rim against the flange, a conical arrangement having an outside part with a cylindrical outside face for engagement in the centering hole of the motor vehicle wheel and a conical inside face and an inside part having an internal bore for placement of the inside part on the axle of the balancing machine and having a conical outside face shaped so it is complementary to the conical inside face of the outside part and resting against the latter, whereby the inside part of the conical arrangement is placed under tension in the direction of the centering hole by spring means, and a radial flange with a contact face for coming in contact with the rim of the motor vehicle wheel extending from the cylindrical outside face of the outside part of the conical arrangement, characterized in that the outside part (13) is formed by separate segments (23) held on the inside part (11) by resilient means, said segments (23) have edges (27) directed radially inward so that they engage behind the opposing edges (26) of the inside part (14) of the conical arrangement and thus prevent segments (23) from slipping down axially from the inside part (11).

* * * * *